May 31, 1938.　　　F. ADAM　　　2,119,090

JAIL LOCK AND THE LIKE

Filed Dec. 12, 1936　　　9 Sheets-Sheet 1

Inventor:
Folger Adam.
by Thos. A. Banning
Atty.

May 31, 1938.  F. ADAM  2,119,090
JAIL LOCK AND THE LIKE
Filed Dec. 12, 1936  9 Sheets-Sheet 2

Inventor:
Folger Adam
by Thos. A. Banning Jr.
Atty.

May 31, 1938. F. ADAM 2,119,090
JAIL LOCK AND THE LIKE
Filed Dec. 12, 1936 9 Sheets-Sheet 3

Inventor:
Holger Adam

Inventor:
Folger Adam
by Thos. Q. Baum Jr.
Atty.

May 31, 1938.　　　F. ADAM　　　2,119,090
JAIL LOCK AND THE LIKE
Filed Dec. 12, 1936　　　9 Sheets-Sheet 6
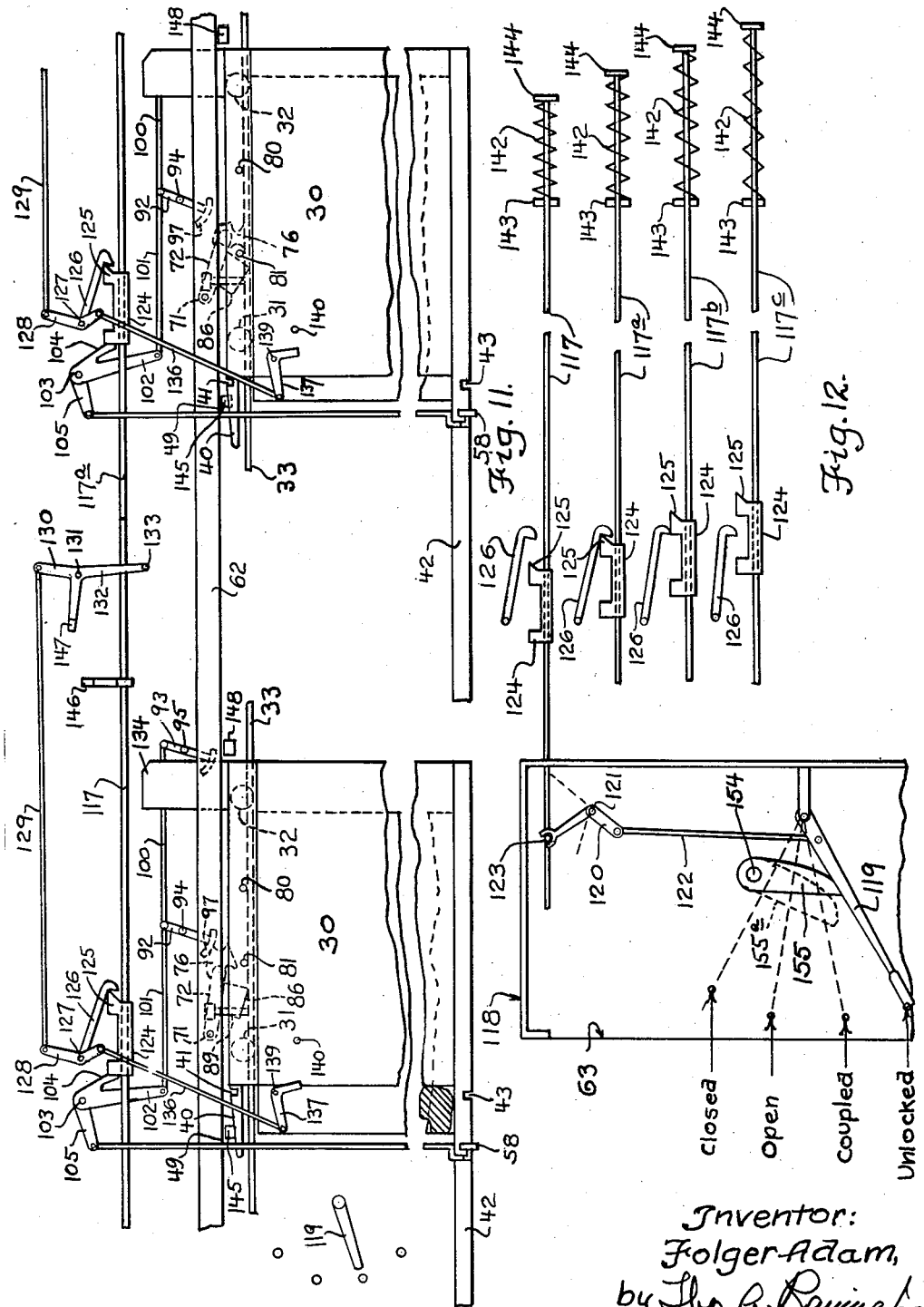
Inventor:
Folger Adam,
by Thos. A. Banning
Atty.

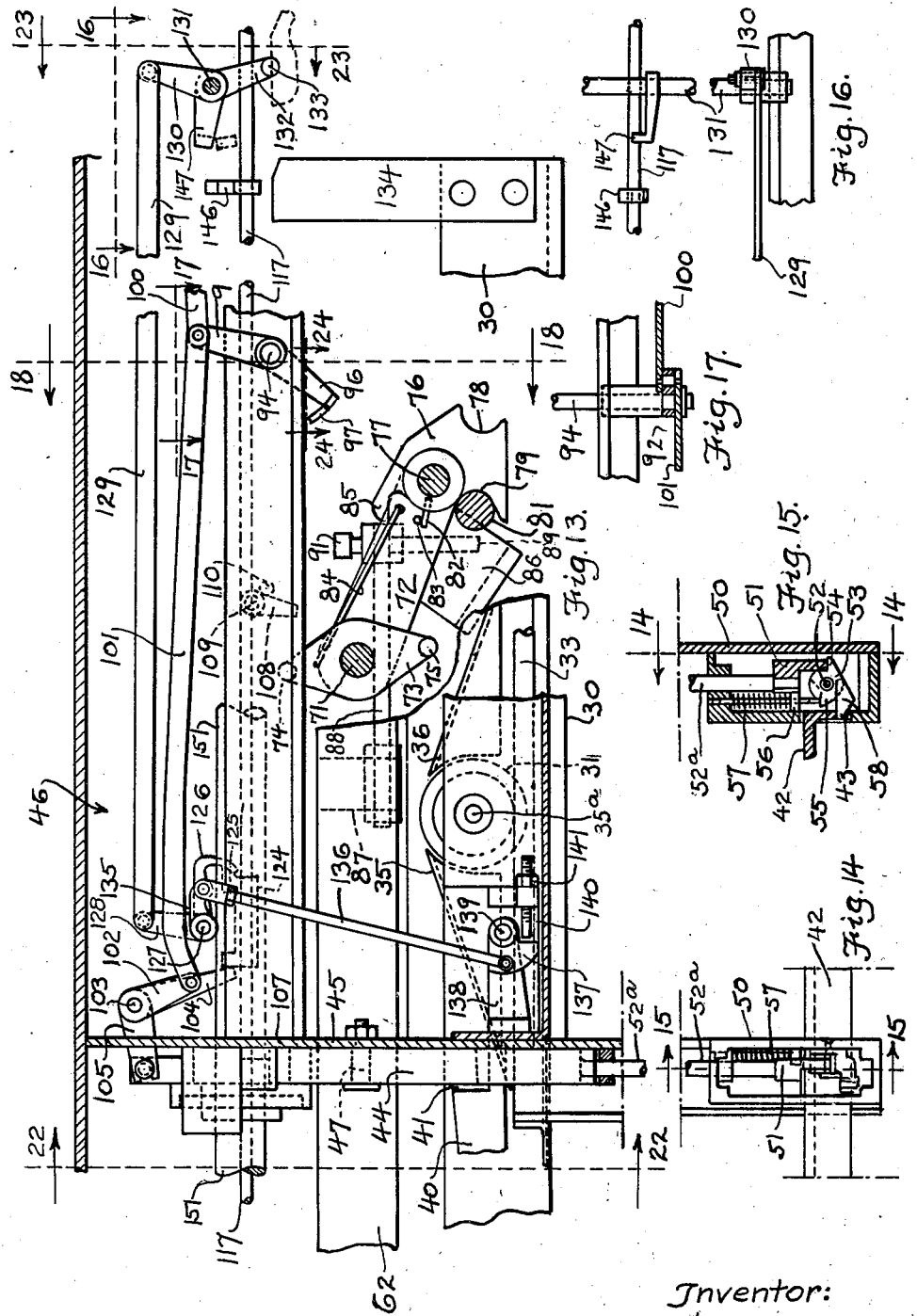

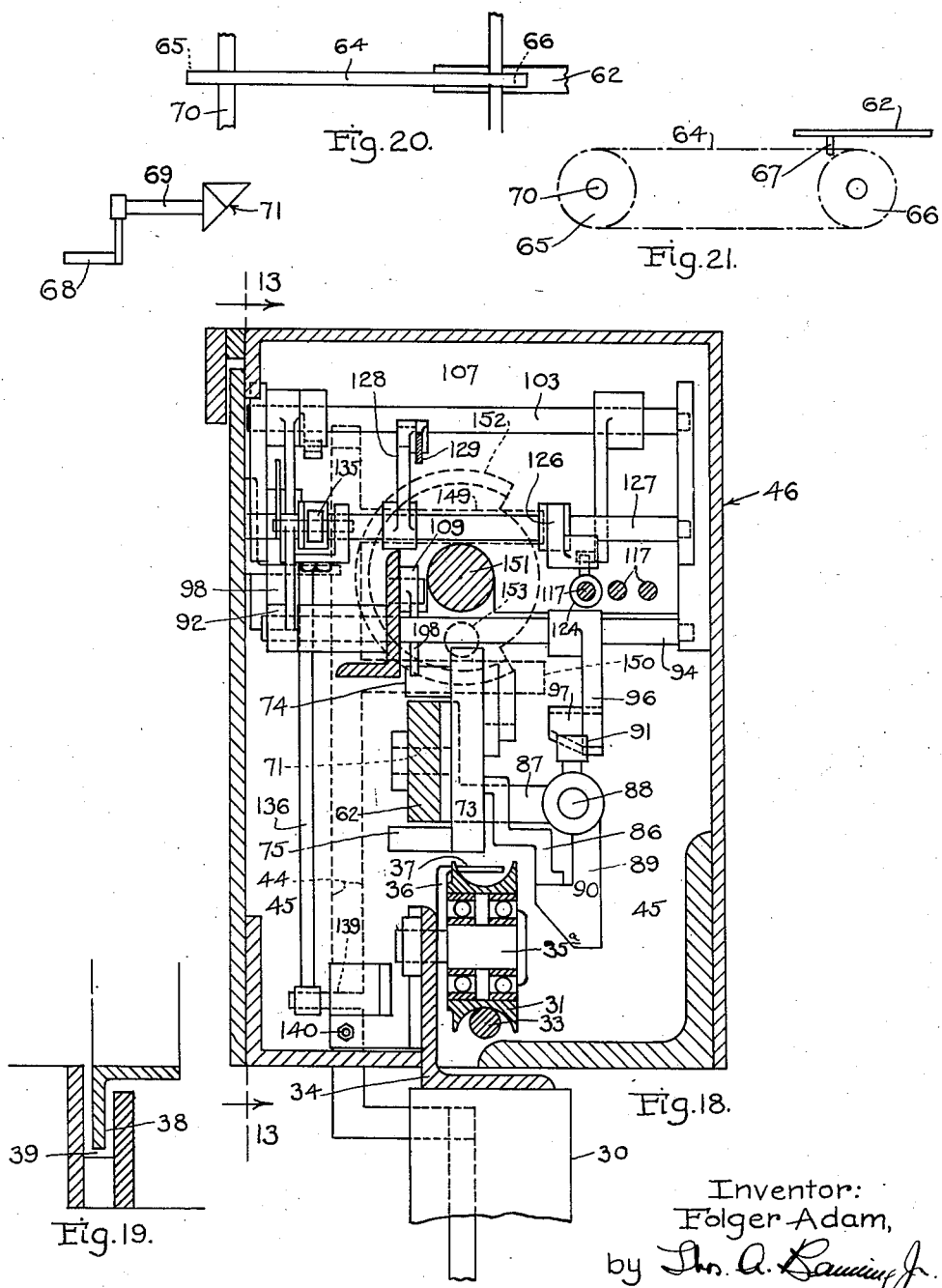

May 31, 1938. F. ADAM 2,119,090
JAIL LOCK AND THE LIKE
Filed Dec. 12, 1936 9 Sheets-Sheet 9
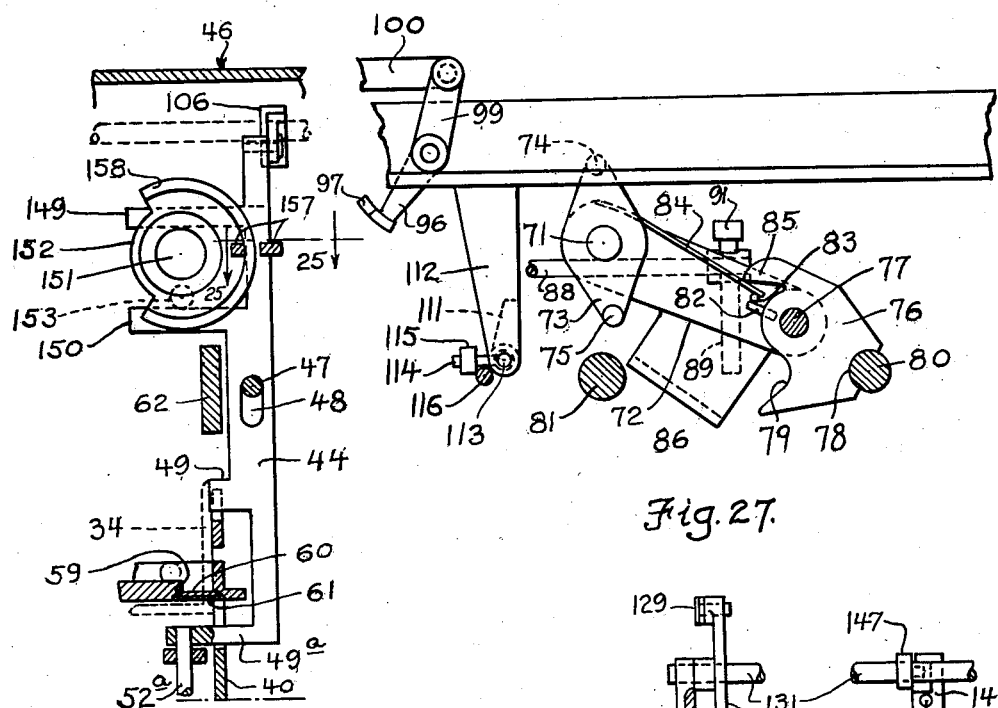
Fig. 22.
Fig. 27.
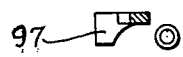
Fig. 24.
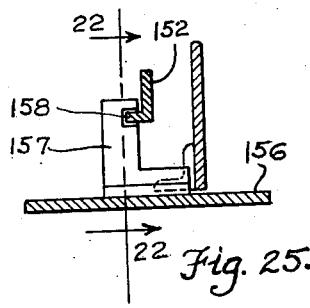
Fig. 23.
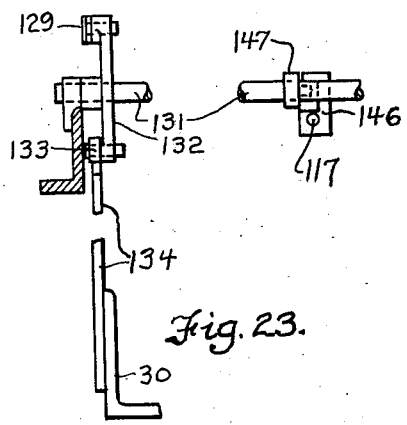
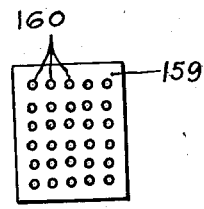
Fig. 25.
Fig. 26.
Inventor.
Folger Adam,
by Thos. A. Banning Jr.
Atty.

Patented May 31, 1938

2,119,090

UNITED STATES PATENT OFFICE 2,119,090

JAIL LOCK AND THE LIKE

Folger Adam, Joliet, Ill.

Application December 12, 1936, Serial No. 115,471

19 Claims. (Cl. 189—7)

The present invention relates to improvements in jail locks and the like. The features of the invention relate particularly to improvements in operating and controlling the operation of the doors and the locking mechanism for the different cells of a row or tier.

The construction herein disclosed is of mechanical form and involves the operation and control of the cell doors by mechanical means.

The clearance or head room available above the top of the door for accommodation of the operating and controlling mechanisms is limited by the head room between floors or tiers; and increase of this head room vertically results in abnormal and undesirable increase in cubic content of the structure without proper proportionate benefit from other standpoints. Increase of the available space above the door opening measured in a horizontal direction results in increase of overhang of the housing which accommodates the cell door operating and controlling devices. This increase of over-hang results in darkening the corridors and other objectional results.

Where the cell doors of a group are all to be controlled or operated from a given station the necessary controlling and operating connections must be extended from that station to each one of the cell doors. The operating devices must be capable of moving the doors in both directions for opening and closing operations and must therefore have a corresponding size, strength, and rigidity. The cell door controlling connections must be provided for the individual doors and therefore of a movement equal to the movement of the cell doors to be controlled from the station in question. The work and forces to be performed and overcome by these controlling connections are relatively small, but where the controlling connections are subjected to compression forces as well as tension forces said connections must nevertheless be of sufficient size and stiffness to stand up and transmit all forces without buckling.

It is therefore one of the objects of the present invention to provide an arrangement wherein the control of the movements and operations of all of the cell doors is accomplished by control rods under tension at all times, said rods being pulled by appropriate levers or other controlling members at the station, and the rods being kept under tension by suitable springs which also restore them to the releasing direction. By this means it is possible to use control rods of small cross sectional areas, a large number of which can be placed in parallel rows within a housing of relatively small height and width extending the length of the tier of cells, said rods being guided at appropriate points throughout their length by suitable perforated plates through which they are extended.

Another feature of the invention relates to the provision of a single longitudinally reciprocating operating bar for a tier of cells which operating bar can be conveniently manipulated at the control stand, this operating bar being of sufficient size and strength and thickness to simultaneously operate all of the doors of the tier.

Another feature of the invention relates to the provision of hook means connected to this operating bar at the position of each of the cell doors, in conjunction with suitable studs or the like on the door itself, and in conjunction with means for controlling the engagement and disengagement of the hook means with the door. This last named control means is controlled and caused to properly function by the positioning of the control rod already referred to and which control rod causes the hook controlling means to function properly at its different positions.

In connection with the foregoing it is a further feature of the invention to make provision for moving the doors in the closing direction under an individual yieldable spring pressure, so that in case any particular door encounters an obstruction during the closing operation said spring means may yield and permit the operating rod to continue its movement in the door closing direction. This will result in a continued movement of all of the other doors of the series in the closing direction and will permit said other doors to be fully closed and then locked, the obstructed door having become disengaged from the operating rod and being then subject to door closing and locking operations by individual action. This arrangement will also result in protecting the mechanism against damage or breakage due to exertion of abnormal forces under abnormal conditions.

In addition to the foregoing it is an object of the invention to make provision for at all times showing the condition and, within limits, the position of each one of the doors of the series, such indication being given at the position of the control stand where the information is useful to the warden or guard. This information will also inform the warden or guard of an abnormal condition existing in the case of any particular door, as for example in the case of an obstructed door which has become disengaged from the operating bar due to circumstances such as already suggested.

The great desirability of such an arrangement will be appreciated from the following statement: It sometimes happens that an unruly prisoner will obstruct the closing movement of his cell door by the use of a block of wood or other convenient obstruction. In the case of an ordinary arrangement of mechanism this obstruction would then make it impossible for the warden or guard to complete the closing movement of the operating mechanism so that the closing and locking of all of the cells of the entire series would be prevented. The warden or guard would then investigate to locate the obstruction, by which time the unruly prisoner would have removed such obstruction from the door, thus making it impossible for the warden to locate the individual cause of the trouble. Upon a second effort being made to close and lock the doors such prisoner would again insert the obstruction and thus again prevent the consumation of the necessary movements. Such a series and sequence of events is eliminated by the device of the present invention.

Another feature of the invention relates to the provision of means for controlling the engagement and disengagement of the actuating hook which is connected to the operating bar, with the proper pins or other parts of the door so as to effectively control the back and forth movements of the door.

Another feature of the invention relates to the provision of gang operating means for controlling the locking and unlocking of the different doors and supplemental to the regular mechanism whereby the doors are ordinarily controlled. This gang locking mechanism may be connected to the regular door controlling and operating mechanism or may be eliminated if desired.

When the gang locking mechanism is used it is a further object of the invention to make provision for also locking the cover plates of the housing in place by a concealed form of lock, the arrangement being such that the cover plates are thus locked in place when the gang locking mechanism is in locked condition, and at all other times except when the gang mechanism release lever is turned to a special point, at which point only the cover plates are released.

Another feature of the invention relates to the provision of a locking bar arrangement whereby each of the cell doors is locked both at top and bottom, and without the necessity of using locking devices in the central portion of the door, which location is objectionable since the presence of projections or bolts on the edge of the central portion of the door is objectionable. By the use of the feature of the invention now referred to the entire edge of the door is left clear and unbroken and unobstructed by any projections throughout its entire height from top to bottom. The danger of persons being caught on or striking against such projections is thus eliminated.

In connection with the feature of engaging the locking bar only with the top and bottom portions of the door it is a further object of the invention to provide an arrangement whereby the locking bar tends to move into the locking position by gravity so as to perform the locking operations both at top and bottom by reason of such gravity movement.

Another feature of the invention relates to the provision of means for continuously and at all times closing and shutting off all openings through which the suspension and control of the door movements are effected so that as the door moves back and forth there is left no open and unprotected opening into which it would be possible for a prisoner to insert a tampering object.

This will prevent the prisoner from reaching through any such opening for the purpose of tampering with mechanism or for the purpose of jamming the door and preventing its normal operations.

In connection with the foregoing it is an object to make provision also for at all times closing the opening through which the locking tongue at the lower end of the door travels.

A further feature of the invention relates to the provision of means for actuating the operating bar back and forth through the necessary distance of travel by a very simple arrangement and one which is so constructed that the operating bar itself does not project outwardly beyond such actuating mechanism at the extreme limit of its travel.

Another feature of the invention relates to the provision of mechanical means for operating and controlling the doors of the gang and which means is so constituted that the doors may be controlled and operated either as a gang or individually; and also such that the individual operations may be performed either from the control stand or at the positions of the respective doors.

Other objects and uses of the invention will appear from a detailed description of the same which consists in the features of construction and combinations of parts hereinafter described and claimed.

In the drawings:

Figures 1 to 11 inclusive show more or less diagrammatically certain successive or sequential positions of the controlling and operating devices in respect to the door and locking bar; and particularly these figures illustrate the following:

Figure 1:
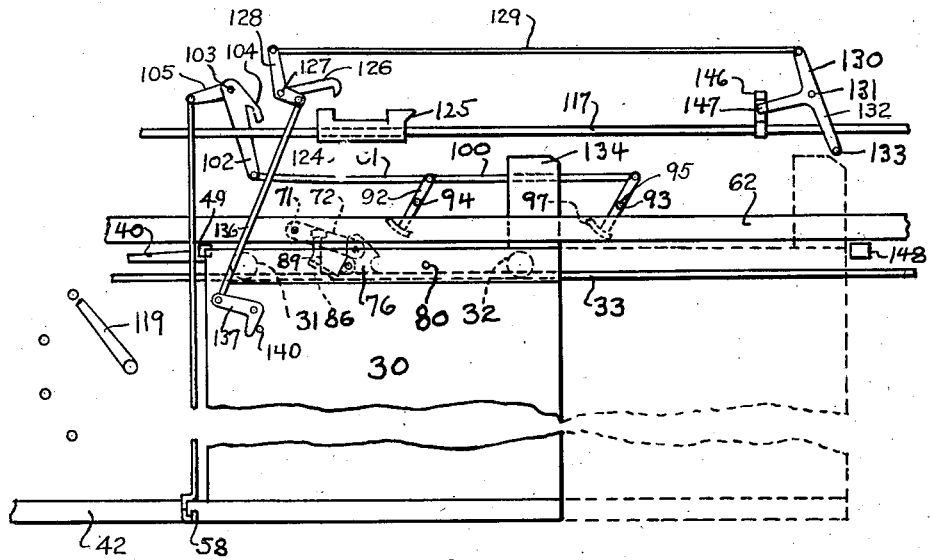
Figure 1 shows the condition with the door closed and locked by means of the locking bar, the control handle indicating "closed"
Figure 7:
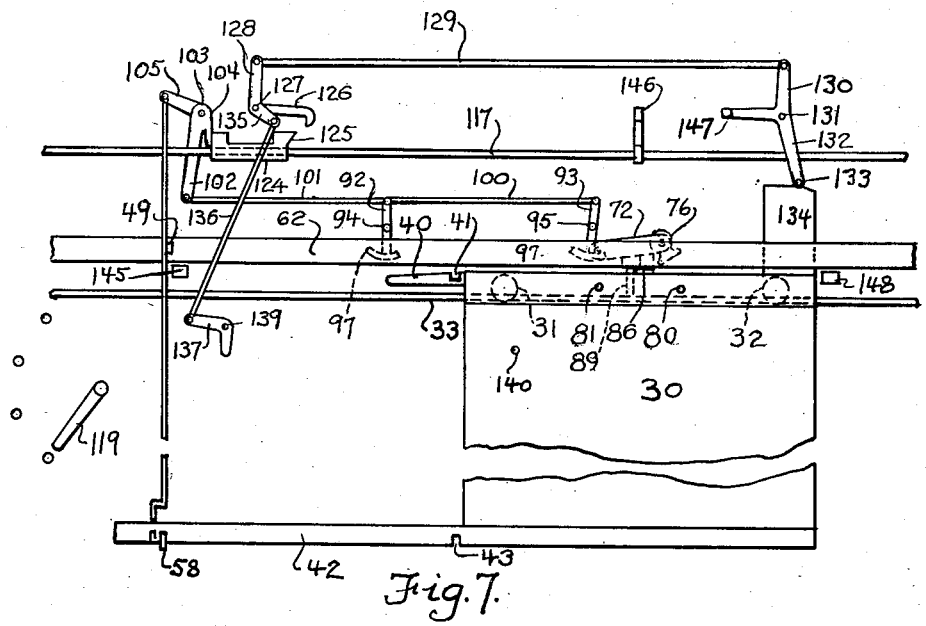
Figure 7 shows the next view of the series in which the master or operating bar has been moved back slightly so as to raise the hook and disengage it from the door studs, the control and indicating handle have been moved to the position of "unlocked". Under these conditions any individual door can be shut either by hand or by the operating or master bar, leaving the other doors open.
Figure 8:
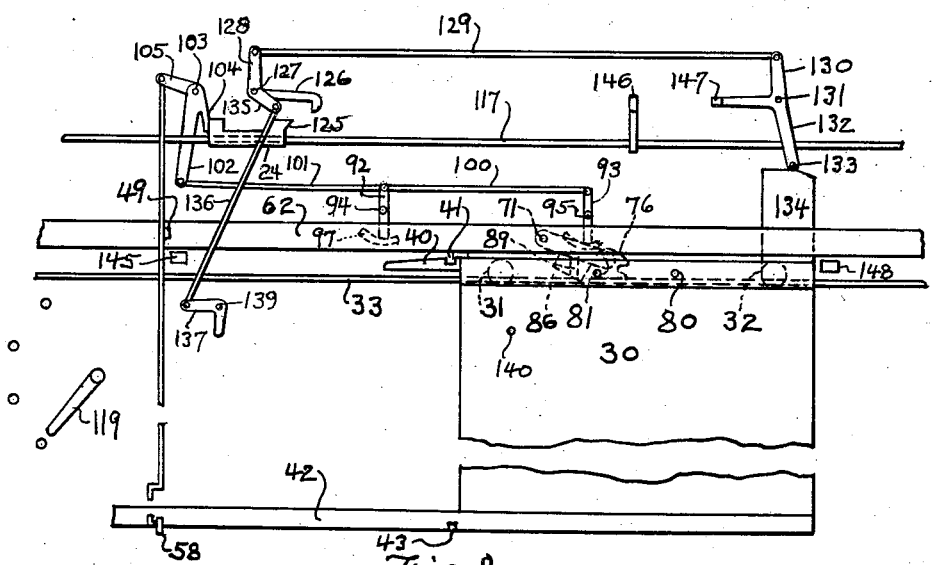
Figure 8 shows the next view of the series in which the door is still fully open, the master or operating bar has been moved an additional amount in the closing direction so as to trip the hook preparatory to causing the same to engage with the closing stud on the door.
Figure 9:
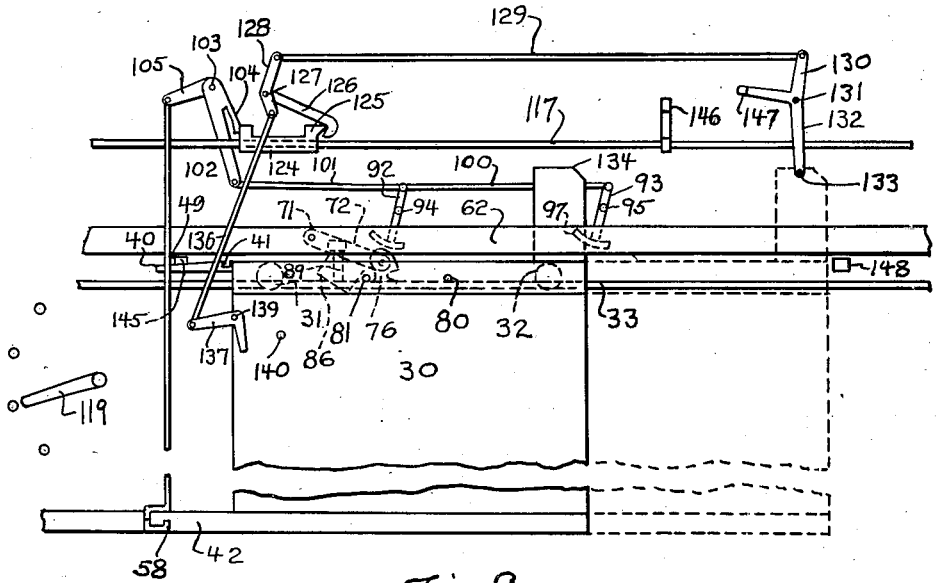
Figure 9 shows the next view of the series in which the master or operating bar has been moved back so as to almost close the door, the control and indicator handle standing in the position of "coupled".
Figure 10:
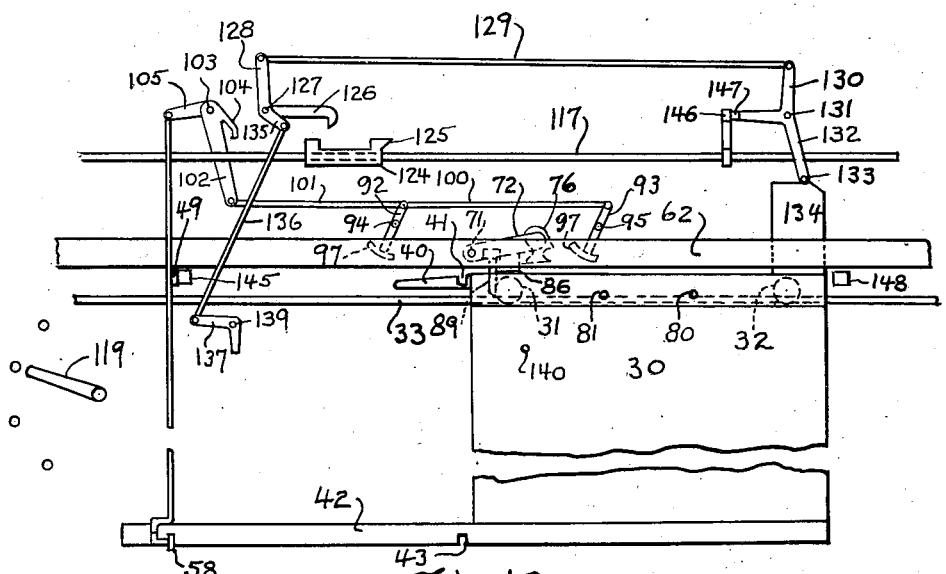

The next movement of the series would carry the parts back to the door closed and locked condition of Figure 1;

Figure 10 shows a view similar to that of Figure 7 with the exception that the master or operating bar has been partly restored in the closing direction but leaving the door open, the control or indicating handle standing in the position of "open";

Figure 11 shows a view similar to Figures 1 to 10 inclusive but illustrating two consecutive doors and the controlling and operating devices of the series, the parts being in the position for closing the doors, and there being an obstruction in the path of movement of one of the doors so as to prevent completion of its closing movement, the other door, nevertheless, continuing normally in its closing movements;

Figure 12 shows more or less diagrammatically a control box together with a control and indicating handle therein for one of the doors, and also shows diagrammatically four control rods, hooks and shoes, for illustrating the four principal positions corresponding to the principal positions of the control and indicating handle;

Figure 13 shows a fragmentary face view in longitudinal section and with parts broken away illustrating the principal controlling and operating devices in the housing above the door, the door standing in its closed position, but with the hook lowered;

Figure 14 shows a fragmentary face view of the locking device for the lower end of the door taken on the line 14—14 of Figure 15, looking in the direction of the arrows;

Figure 15 shows a section on the line 15—15 of Figure 14 looking in the direction of the arrows;

Figure 16 shows a fragmentary plan view on the line 16—16 of Figure 13 looking in the direction of the arrows;

Figure 17 shows a fragmentary plan view on the line 17—17 of Figure 13 looking in the direction of the arrows;

Figure 18 shows a cross section on the line 18—18 of Figure 13 looking in the direction of the arrows;

Figure 19 shows a typical fragmentary section through the gutter slot within which the lower edge of the door travels;

Figure 20 shows diagrammatically a fragmentary side elevation of a simple form of connections for moving the operating bar;

Figure 21 shows a plan view corresponding to Figure 20;

Figure 22 shows a fragmentary cross section on the line 22—22 of Figure 13, looking in the direction of the arrows;

Figure 23 shows a fragmentary cross section on the line 23—23 of Figure 13, looking in the direction of the arrows;

Figure 24 shows a fragmentary cross section on the line 24—24 of Figure 13, looking in the direction of the arrows;

Figure 25 shows a fragmentary horizontal section on the line 25—25 of Figure 22, looking in the direction of the arrows;

Figure 26 shows a typical spacer plate through which the control rods may be run for holding a large number of control rods in alignment within the housing; and Figure 27 shows a fragmentary view similar to that of Figure 13, with the exception that it shows the hook and certain related parts located adjacent to the extreme limit of door opening movement.

Referring first to Figures 13 to 27 inclusive, the door panel (designated 30 in Figures 1 to 11 inclusive) is provided with a pair of caster hangers 31 and 32 at its upper end (see Figures 1 to 10 inclusive), which caster hangers travel on a horizontal rod or rail 33. For this purpose the door proper is conveniently provided with an angle bar 34 along its upper edge, and the casters are journaled on studs 35a secured to the vertical flange of this angle bar. Preferably also each caster is mounted on ball bearings as shown in Figure 18.

There are the slanting guards 35 and 36 located immediately adjacent to the front and rear sides of the casters and travelling with the door, each guard having a flange 37 which projects out so as to cause certain of the mechanisms hereinafter to be described to ride over the caster if necessary. Nevertheless these guards do not in any way interfere with the normal functioning of the casters.

The lower edge of each door is also provided with a downwardly extending flange 38 (see Figure 19), preferably constituting one of the flanges of an angle bar secured to the lower edge of the door. This flange 38 travels within a gutter 39 formed in the floor or gallery of the tier of cells. Thus the door is guided in its travels but is prevented from swinging outwardly by a rocking movement on the rail 33.

At its upper end the door carries a tapered hook or tongue 40 having the notch 41 which is adapted to receive a locking tooth for the upper portion of the door; and the lower end of the door is provided with a horizontal extension bar 42. This extension bar reaches through an opening of proper shape and size in the permanent structure and adjacent to the lower end of the door jamb. The length of this extension 42 is such that said extension always reaches into the opening of the door jamb even when the door is fully opened. Consequently the opening in the door jamb is never uncovered or exposed even when the door is fully opened, and assurance is thus had that the prisoner cannot tamper with the normal functionings of the door or cause the door to jam by inserting foreign obstructions into such opening.

The extension 42 is provided with a notch 43 in its lower portion. As best shown in Figures 14 and 15 this extension 42 conveniently takes the form of an angle bar and the notch 43 is then formed in the lower edge of the vertical arm of such angle bar as clearly shown in Figure 15.

Means are provided for simultaneously engaging and disengaging both of the notches 41 and 43 for locking and unlocking the door. This means will now be explained:

There is a vertically slidable block 44 which is mounted for sliding movement against the face of a transverse partition 45 formed in the head housing 46 directly above the position of the closing end of the door opening. This block 44 is held in place by a stud 47 secured to said partition, the block being provided with a slot 48 to accommodate said stud and permit the necessary amount of vertical movement (see Figure 22).

The lower edge 49 of the block 44 constitutes a tongue which when lowered may engage the notch 41 in the member 40 so as to lock the upper end of the door. It will be noted from various figures that the upper edge of the member 40 is tapered so that if the door is run shut while the member 44 is in lowered position said member 40 will run itself under the tongue 49, gradually raising the block 44 until finally said block drops down by gravity to lock the door.

There is a small housing or box 50 adjacent to the door jamb. Within this box 50 there is an L-shaped finger 51 which finger is connected to the tongue 49$^a$ by means of a rod 52$^a$ so that the finger 41 travels up and down with the tongue 49$^a$.

Within the box 50 there is also a short or stub shaft 52 upon which is mounted a block 53. Said block is provided at one side with a finger 54, the top face of which will be engaged by the finger 51 and at the other side with the finger 55. There is a pin 56 which is normally spring pressed downwardly by a spring 57 within the box 50 so that normally the stub shaft 52 is rocked in a direction corresponding to the raising of the rod 52$^a$.

There is another finger 58 connected to the block 53. When the stub shaft 52 is rocked into the position shown in Figure 15 this finger 58 is moved up to engage the notch 43 so as to lock the lower edge portion of the door.

It will be noted that with the above arrangement the downward movement of the tongue 49 by gravity is accompanied by an upward movement of the finger or tongue 58 against the force of the spring 57 and that when the block 44 is raised so as to raise the tongue 49 to unlock the upper edge of the door the lower edge of the door is simultaneously unlocked by the action of the spring 57.

The vertical arm of the angle 34 on the upper edge of the door travels through a slotted opening 59 formed in the top or sill of the door casing. There are the thin plates 60 and 61 which are laid on top of each other and have their edges working in grooves at the sides of the slotted opening 59. These plates 60 and 61 are connected to each other and to the edge of the door by pins with slotted openings so that as the door opens and closes the plates 60 and 61 are drawn back and forth with a telescoping operation in order to draw them over the slotted opening 59 and continuously close the same beyond the position of the door.

Extending along within the head structure above the cell doors there is a master or operating bar 62. This bar extends along the full length of the tier of cells which are to be operated and controlled from a position adjacent to or within a control box 63 (see Figure 12), which is located at a convenient position, generally at one end of the tier of cells. This master or operating bar 62 is to be moved back and forth endwise with an amount of travel sufficient to accomplish the opening and closing door movements and a slight additional amount for the purpose of performing certain evolutions which will be explained in detail. Thus for example, in the case of doors having a movement of two feet the back and forth movement of the master or operating bar would probably be about twenty-seven inches.

The back and forth operating bar movements are conveniently performed by means of a short chain 64 (see Figures 20 and 21), passing over sprockets 65 and 66 located in the upper portion of the housing 63; and the distance between these sprockets is sufficient to permit the full back and forth operating bar movement measured between the center lines of the sprockets.

A stud 67 is secured to the chain 64 and to the master bar 62 and as the chain travels back and forth the master bar is properly moved.

A crank 68 is provided on a short drive shaft 69 which is in turn connected to a vertical shaft 70 by means of bevel gears 71, the shaft 70 carrying the sprocket 65 at its upper end. The turning of the crank 68 therefore serves to operate the operating bar.

Mounted upon the operating bar at the position of each cell door to be served, there is a stud 71 (see Figures 13, 18, and 27 in particular). There is an arm 72 mounted on this stud, which arm can swing between the raised or disengaged position of Figure 12 and the lowered or engaged position of Figure 27, and Fig. 13. There is connected to the arm 72 a block 73 having the upper and lower pins 74 and 75 respectively so that by engaging one or the other of these pins the arm is swung up and down.

To the outer end of the arm 72 there is pivotally connected a hook block 76, the form of which is well shown in Figures 13 and 27. This hook block is pivoted on the stud 77 on the outer end of the arm 72. Said hook block is provided on one edge with the door opening recess 78 and on the other edge with the door closing recess 79. These recesses are adapted to engage studs 80 and 81 respectively, which are carried by the upper portion of the door, such engagement, however, only being effective when the arm 72 is lowered into the position of Figure 27.

The hook block 76 is provided with a pin 82 which will come to bear against a pin 83 on the arm 72 in order to limit the turning of the hook block 76 in a clock-wise direction when viewed as in Figures 13 and 27; but the hook block can turn backwardly a certain distance under certain adverse conditions. There is a leaf spring 84 having one end rigidly secured to the arm 72 and stud 71. The other or free end of said leaf spring bears against a finger 85 on the hook block, thus normally turning the hook block 76 over into the position shown in Figures 13 and 27.

It will be noted that when the recess 78 of the hook block engages the stud 80 for opening the door there is produced a toggle action due to the fact that the pivot point 77 lies above the line extending between the pivot points 71 and 80. Consequently the force exerted in the direction of door opening movement causes the pin 82 to bear against the stud 83 of the arm 72. It will likewise be noted, however, that when the parts are moved over so as to carry the recess 79 into engagement with the door closing pin 81 (which condition is shown diagrammatically in Figures 1, 8, 9, and 11), the force exerted by the hook block on the stud 81 tends to turn the hook block in a counter clockwise direction so as to carry the pin 82 away from the stud 83, which movement, however, is resisted only by the force of the leaf spring 84. In the case of exertion of an excessive force due to jamming of the door, for example, the leaf spring will yield and allow the hook block to turn with respect to the arm 72, the pin 82 moving away from the stud 83 and the hook block will thus turn or rotate on the pin 81 until a time arrives when it will snap over said pin, the arm 72 being at the same time tilted up on the stud 71. Under these conditions the master or operating bar is permitted to be drawn back in the door closing position so as to continue the closing movement of the other doors, the obstructed door being disengaged and allowed to stand in a partly opened condition for the time being.

No such disengaging action is ordinarily needed in the case of a door opening movement since the door would not be obstructed in such a movement, but only in the case of door closing.

As the master or operatng bar 62 is moved back and forth it is apparent that the swinging up and down of the arm 72 so as to raise and lower the hook block will dictate the manner in which the different doors of the series are respectively engaged with and disengaged from the operating bar. I have therefore provided means for effecting such raising and lowering of the different hook blocks for the different cells under control of the operator.

Each of the arms 72 has on its back face a backwardly and downwardly extending finger 86 (see Figures 13, 18, and 27). This finger is of a peculiar shape best revealed in Figure 18, so as to clear various devices as the master or operating bar and arm 72 moving back and forth. The master or operating bar is provided with a rearwardly extending bracket 87 at a position somewhat in advance of the stud 71 on which the arm 72 is mounted, and a pin 88 is secured to the bracket 87 and reaches along parallel to the operating bar to a position about opposite to the finger 86. There is a downwardly depending hook 89 pivoted on the pin or rod 88 and normally depending straight down into a position such that the finger 86 will stand upon and be supported by the lug 90 of such hook as shown in Figure 18 in particular; but upon swinging the hook towards the right in Figure 18 (away from the observer in Figures 13 and 27), the hook is disengaged from the finger and the finger is allowed to drop. This also allows the arm 72 and the hook block to drop down into the position of Figure 27.

A stud 91 (see Figures 13, 18, and 27) is connected to the hook 89 and projects upwardly therefrom; and conveniently this stud is provided with a roller or other anti-friction surface.

Ordinarily the engagements and disengagements of the hook blocks with the pins 80 and 81 on the doors are to be controlled either adjacent to the door closed position or adjacent to the door opened position. There are the arms 92 and 93 carried by the transverse rock shafts 94 and 95 (see Figures 1 to 11 inclusive). The rock shaft 94 appears in Figures 13 and 18, and the rock shaft 95 appears in Figure 27. Extending down from each of the rock shafts 94 and 95 there is an arm 96 having at its lower end a finger 97 of the curved and cam form clearly illustrated in Figures 18 and 24. Forward ends of the rock shafts 94 and 95 carry the upwardly extending arms 98 and 99 respectively, which upper ends are connected together by a parallel motion link 100, (see Figures 13, 17, and 27). The upper end of the arm 98 on the shaft 94 is also connected to a control link 101 which reaches forward within the head box to a position above the door closed position, so that by manipulation of the link 101 both of the cam fingers 97 are simultaneously positioned.

Figure 6:
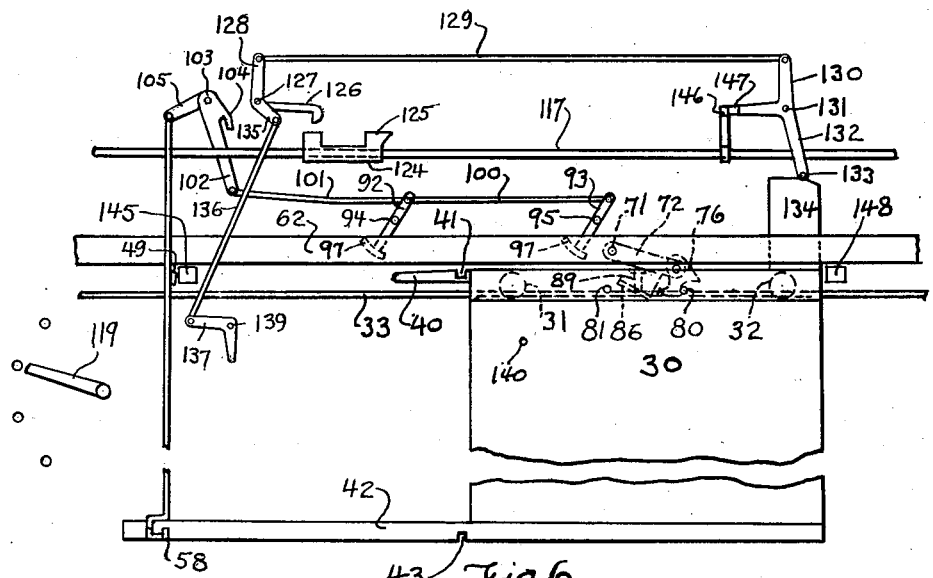
Figure 6 shows the next view of the series in which the movement of the master or operating bar in the opening direction has been completed so that the door is fully opened, the hook has thereby been disengaged from the shoe so as to allow the control and indicating handle to move to the position indicating "open"

When the link 101 is swung to the right, or rearwards, a sufficient distance as shown, for example, in Figure 6 the endwise movements of the operating bar, carrying with it the brackets 87 and fingers 89 and studs 91, will permit said studs to pass freely beneath the cam fingers 97 and without any engagement therewith so that the hooks 89 will not be swung backwardly, but will be allowed to depend naturally in the engaging position of Figure 18. On the contrary, when the link 101 is drawn towards the left a sufficient distance in Figure 13 so as to move the fingers 92 and 93 into the vertical position the cam fingers 97 will hang down low enough to interfere with the travel of the studs 91 on the hooks 89, thus causing said hooks to be rocked in a counter clock-wise direction when viewed as in Figure 18, and thereby disengaging from the fingers 86 and permitting the arms 72 to drop down into the engaging position of Figure 27. It is thus evident that the function of the link 101 is to control the disengagement of the hooks 89 from the respective fingers 86 when the hook blocks 76 are to be lowered into the working position.

The cam fingers 97 for the two controlling positions are so formed as to cause disengagement of the hooks 89 from the finger 86 at the proper time in the sequence of movements.

The forward end of the link 101 connects to a finger or crank 102 which depends from a transverse rock shaft 103 journaled across the front end of the housing. On the rock shaft 103 there is a downwardly depending finger 104 and also a forwardly extending finger 105. The finger 105 reaches through a slotted opening 106 (see Figure 22 in particular) in the partition 107 at the front end of the housing. Manifestly a movement of the finger 104 to the left in Figure 13 or a raising of the finger 105 will so rock the shaft 103 as to swing the cam fingers 97 down into the working position.

The pins or studs 74 and 75 on the block 73 (see Figures 13 and 27) serve to rock the block 73 and thereby swing the arm 72 upwards. Such upward swinging is accomplished in the following manner; adjacent to but slightly prior to the door closing position there is a finger 108 pivoted at the point 109 and normally depending into the position shown in Figure 13 where it rests against a fixed stop 110. When this finger is in the lowered position illustrated in Figure 13 it will interfere with the travel of the stud 74 as the door is moved in the opening direction, to thereby raise the arm 72 into the position shown in Figure 12. Thus for example if the arm is initially in its lowered position and the master or operating bar is moved towards the right in Figure 13 the stud 74 will strike against the finger 108 which cannot yield in that direction due to the presence of the stop 110, and consequently the block 73 will be swung over into the position shown in Figure 12 thereby raising the arm 72 and the hook block 76 into the position of Figure 12. In the case of a door closing movement with the arm and hook block in the lowered position the pin or stud 74 will travel past the finger 108 which can swing to the left for that purpose, thus permitting the door closing movement to be accomplished without damage.

Adjacent to the extreme limit of movement in the door opening direction there is another finger 111 which is pivoted to a bracket 112 at the point 113. This finger 111 has a short horizontal arm 114 on which is a counter-weight 115 (see Figure 27), so that the finger 111 normally stands in the position of Figure 27 with the arm 114 resting against a fixed stop 116. This finger 111 then stands in the path of travel of the stud 75 on the arm 73 when the arm 72 and hook block 76 are in the lowered position of Figure 27. In other words with the parts in that position and at the extreme limit of movement in the door opening direction, when the movement in the door closing direction takes place the stud 75 will strike against the finger 111 which is held against yielding, and the block 73 will be swung around, thereby raising the arm 72 and hook block 76. A movement in the door opening direction may be accomplished without damage to the parts by reason of the fact that the finger 111 is then permitted to yield by swinging to the right in Figure 27.

Figure 2:
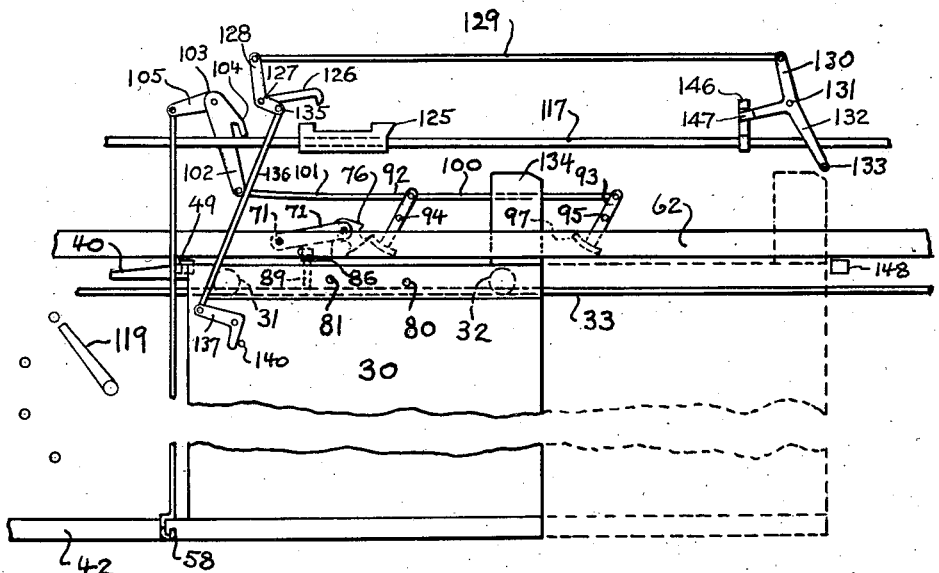
Figure 2 shows a view similar to that of Figure 1, but the operating or master bar has been moved slightly to the right so as to disengage the hook from the door closing stud and to trip and raise the hook, the control lever still standing in the position of "closed"

A consideration of the functioning of the devices thus far explained will yield the following conclusions:

With the hook block in the lowered position of Figure 1 where it stands between the studs 80 and 81 on the door, and with the door in the closed position, as the operating or master bar 62 is moved towards the right the arm 72 and hook block 76 will first be swung up into a position such as that shown in Figure 2, due to the engagement of the stud 74 with the finger 108. This operation will serve to hook the finger 86 onto the hook 89 and thus retain the hook block in the raised position for the time being.

Figure 4:
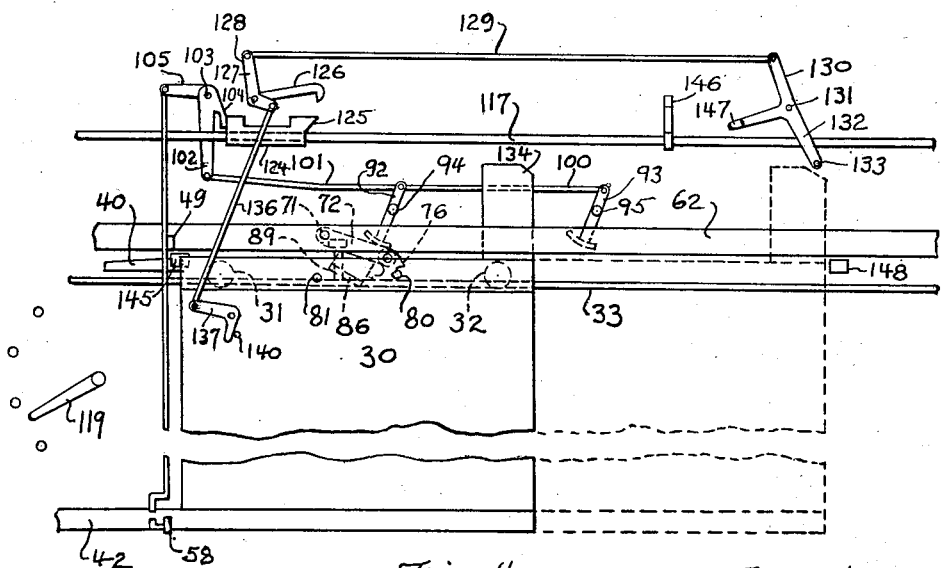
Figure 4 shows a view similar to that of Figure 3 with the exception that the operating or master bar has been moved an additional distance to cause the hook to again drop preparatory to engaging the stud on the door for movement in the opening direction.

As the master bar is thereafter moved in the opening direction, carrying with it the hook block, the hook 89 and stud 91 also travel with the master bar; and after a short distance of such travel the stud 91 will engage the cam finger 97 on the lower end of the finger 96, whereupon the hook 89 will be swung over, releasing the finger 86, and permitting the hook block to drop down into the position shown in Figure 4. This operation takes place between the two studs 80 and 81 which are located on the door so that the hook block 76 now stands in position to engage the stud 80. The continued travel of the master or operating bar in the door opening direction will then carry the door with it so that the door will be opened.

Considering the operations up to this point, when the parts are in the door locked position of Figure 1 the rock shafts 94 and the linkage 100 and 101 are in the position of Figure 1 wherein it will be noted that the cam fingers 97 are swung up away from the line of travel of the stud 91. Under these conditions the advancement of the master or operating bar in the door opening direction does not bring about any engagement of the stud 91 with the cam finger 97 and consequently when the hook block has been raised and hooked in the raised position it will remain in that position until the rock shafts 94 have been turned so as to lower the cam fingers 97 into the interfering position.

Figure 3:
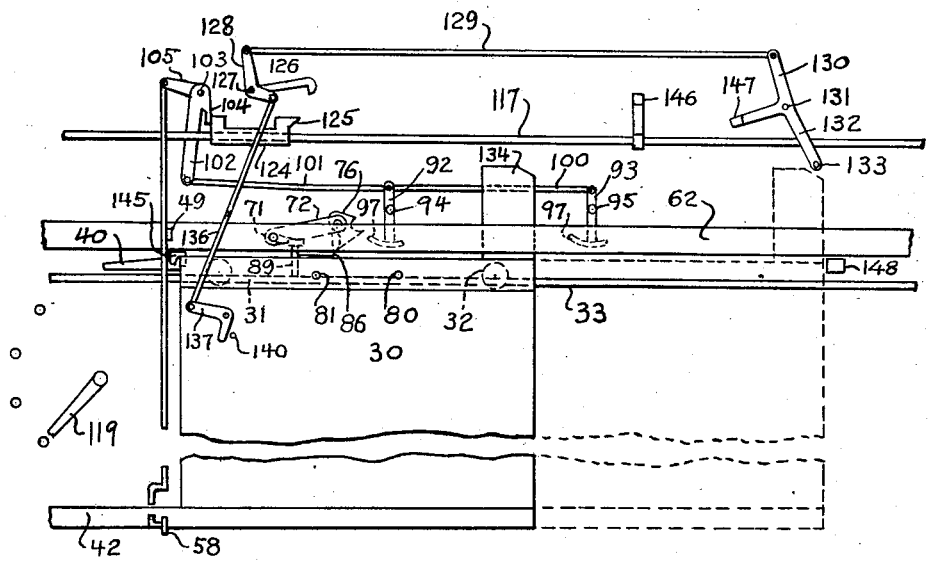
Figure 3 shows a view similar to that of Figure 2 with the exception that the control handle has been moved down to the position of "unlocked" so as to unlock and disengage the locking bar from the door preparatory to permitting the door to be opened.

Between the position shown in Figure 1 and that shown in Figure 3 the rock shafts 94 should be turned so as to lower the cam fingers 97 down into the interfering position, so that as the master or operating bar travels in the door opening direction the hook block will be dropped down into the position to engage the stud 80 on the door before the hook block has passed said stud. This is the condition shown in Figure 4.

As the door is moved in the opening direction the hook block will maintain its engagement with the stud 80 until the full door open position of Figure 6 has been reached. Thereafter when the master or operating bar and the hook block are moved in the door closing direction the stud 75 will engage the finger 111 (see Figure 27), swinging the arm 72 upwards and carrying the hook block 76 up into the position indicated in Figure 7. As the movement of the master or operating bar continues in the door closing direction the stud 91 will next engage the cam finger 97 thereby rocking the finger 89 and releasing the hook block which will be allowed to drop down into position to engage the stud 81 on the door. This will take place before the hook block has passed said stud when travelling in the door closing direction, thereafter the continued movement of the master bar and hook block in the door closing direction will cause the door to be carried along and closed.

I will now explain more in detail the mechanisms which are used for controlling the various parts including the cam fingers 97. Corresponding to each of the cell doors which is to be controlled there is a control rod 117. All of these control rods extend lengthwise within the head housing above the cell doors. These control rods are all brought into a common control stand or station designated as a housing 118 in Figure 12. In that housing there is a lever 119 corresponding to each of the rods 117 and each of these levers is connected to its rod 117 by means of a bell crank 120 pivoted to a stationary part 121, a link 122, connecting each lever 119 to one arm of its bell crank. The other arm of the bell crank is connected to its rod by means of a pin and fork connection 123. Located on each of the rods 117 there is a shoe 124, one end of which is undercut to provide a hook 125. There is a hook 126 in the head housing immediately above each of the shoes 124 and carried by a rock shaft 127. This rock shaft 127 carries at one point an upwardly extending finger 128 to which there is connected a link 129, which link extends over to a position near the door open position and is connected to a finger 130 on a shaft 131 at that location. The shaft 131 in turn has a downwardly depending finger 132 the lower end of which carries a roller 133; and the door is provided with an upstanding lug or member 134 having on its upper edge a cam surface adapted to engage the roller 133 for the purpose of rocking the finger 132 when the door reaches the fully opened position. Such rocking movement forces over the link 129, thereby raising the finger 126 away from the position of the shoe 124.

The shaft 127 also carries a finger 135, to the outer end of which is connected a link 136. This link extends down and is connected to a rock block 137 which is pivoted to a bracket 138 at the point 139. The door itself or one of the pulley brackets on the door carries a stud 140 which projects towards the finger 137 and is located in position to engage said finger as the door closing movement is completed. The stud 140 can be adjusted back and forth and locked by means of a lock nut 141.

With the above arrangement it will be evident that the completion of the door closing movement serves to rock the shaft 127 and thus disengage the finger 126 from the hook end 125 of the shoe 124. Said shoe will therefore be disengaged. It is thus evident that the shoe is disengaged by the completing of the movement of the door in either the opening or closing direction.

Each of the control rods 117 is placed under tension by a spring 142 which bears against a fixed stop 143 and also against a finger or disc 144 carried by the rod 117. The tendency therefore is for the rod to be moved always towards the right in Figure 12 and furthermore the rod is at all times kept under tension.

The levers 119 serve to control the positions of the rods 117 and also serve to indicate the condition of the mechanism to the guard or warden in charge thereof. There are four principal positions of this lever 119 designated in Figure 12 as "closed", "open", "coupled", and "unlocked". It will be noted from the explanation already given that when the lever 119 is permitted to rise to the position marked "closed" the locking bar is permitted to drop into the locking position by reason of the travel of the shoe 124 towards the right, the maximum distance permitting the finger 104 to swing over and allow the finger 105 to swing down. During this condition also both of the cam fingers 97 are swung up into the non-interfering position by reason of the movement of the links 100 and 101 towards the right.

Now when the lever 119 is drawn down to the unlocked position the rod 117 is drawn over towards the left against the force of its spring 142 so that the shoe 124 will engage the finger 104 and raise the locking bar into the unlocked position of Figure 3. At the same time the cam fingers 97 are swung down into the interfering position. Therefore with the parts in these conditions it is possible for the warden to move the master or operating bar towards the door opening direction so as to perform the evolutions necessary in passing from the condition of Figure 2 to that of Figure 4, and in so doing the hook block 76 is engaged with the stud 80 and the door opening movement is commenced.

It will be noted that the spring 142 will tend to restore the rod 117 towards the right thus carrying the shoe 124 with it and permitting the locking bar to again drop to the locking position. This will also tend to raise the lever 119 back towards the closed position in Figure 12. It will be noted, however, that as the door opening movement commences the stud 140 moves back away from the finger 137 which permits the hook 126 to drop down into position to engage the hook 125 of the shoe 124; and this operation must take place before the spring 142 is allowed to draw the rod 117 over to the right. It is therefore necessary for the operator to either hold the lever 119 down while the door is shifted over slightly towards the opening position or else to provide means for starting the opening movement of the door as soon as the lock bar is disengaged from the locking engagement with the door.

Figure 5:
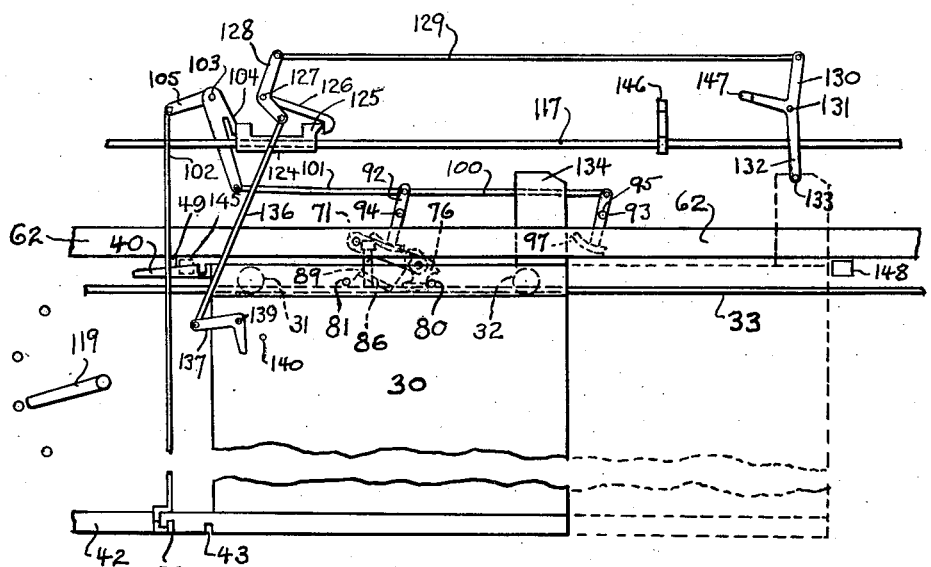
Figure 5 shows the next view of the series in which the operating or master bar has been moved over to pick up the door and the door has been moved a slight distance in the opening direction, and the hook has dropped down to engage the shoe so as to retain the control and indicator handle in the position of "coupled"

Owing to the fact that there are a large number of cell doors to be simultaneously controlled it is desirable to make provision for slightly starting the door in the opening direction as soon as the lever 119 is drawn clear down to the unlocked position at which position the locking bar unhooks from the door. I have therefore indicated a door starting device 145 mounted at a convenient point on the permanent structure adjacent to the door itself, which door starter includes a spring pressed element which is so constructed that the spring is normally under pressure when the door is closed and tends to release itself and force the door open a slight distance when the door is unlocked. Various devices for this purpose are known in the art and it is therefore deemed unnecessary to illustrate or describe the same in detail. It will be noted, however, that by the use of such a device, as soon as the handle 119 is pulled down into the unlocked position of Figure 12 the locking bar is disengaged, allowing the door to move open slightly and in fact a distance sufficient to carry the stud 140 back from the block 137 so as to drop the hook 126 down into the position where it will engage the hook 125 of the shoe 124 and thus retain the rod 117 against movement under the force of the spring 142. This condition is illustrated in Figure 5. With the parts in this position the lever 119 stands in a position to indicate "coupled" so that the warden is informed as to the condition of the parts.

As the door reaches the fully opened position of Figure 6 the shoe or extension 134 will engage the roller 133 on the finger 132, thus again causing the hook 126 to rise and disengage from the hook 125 on the shoe 124. Thereupon the spring 142 will immediately draw the rod 117 towards the right and cause the lever 119 to move up.

There is mounted upon the rod 117 an upwardly extending hook finger 146 (see Figure 13). There is also mounted on the shaft 131 a hook-shaped finger 147. These fingers 146 and 147 are so constructed that when the shaft 131 stands in a given position its finger 147 will interfere with the movement of the rod 117 towards the right in Figures 12 and 13; whereas when the shaft 131 is rocked either a greater or lesser extent than indicated in Figure 13 its hooked finger 147 will not interfere with the finger 146 on the rod 117 but will permit said rod to move over a further distance towards the right or in the door opening direction.

The parts are so devised that when the door is fully opened so as to engage its extension 134 with the roller 133 the shaft 131 is rocked to carry the finger 147 into the interfering position so that the movement of the rod 117 towards the right will be arrested and this will take place when the lever 119 has been raised only to the "open" position in Figure 12. Such a condition is indicated in Figure 6.

It will be noted that the lever stands at the open position. This gives the warden definite and visual evidence of the fact that the cell door is open.

In case the master or operating bar should be moved back in the door closing direction while the lever 119 stands in the "open" position which it has naturally assumed due to the opening of the door, the cam fingers 97 would stand in a raised condition so that they would not properly perform their function of disengaging the hook 89 from the finger 86. Consequently, however, if the master or operating bar should be moved in the door closing direction under these conditions the hook block would be raised and retained in the raised position so that it would not properly engage the stud 81 on the door and consequently the door would not be closed but would be left standing open. This is the condition indicated in Figure 10. Thus a selected door may be left in the open condition when the master or operating bar is restored in the closing direction.

However, by drawing the handle 119 down into the "unlocked" position shown in Fig. 7, then when the master or operating bar is moved in the door closing direction the hook block is first raised and hooked in the raised position. In order to cause the cam finger 97 to properly engage the stud 91 it is necessary to draw the handle 119 down into the unlocked position of Figure 7 and retain it in such position while the door closing movement of the master or operating bar proceeds until such time as the extension 134 of the door shall have moved away to permit the roller 133 to move down and thus permit the hook 126 to engage the hook 125 of the shoe 124 in the manner indicated in Figure 9. It may therefore sometimes be desirable to make use of a door starter 148 at the door open position, which when used will generally also be provided with a catch for hooking the door in the open position until the door closing movement is to be commenced. Under such conditions it would also be desirable to use means for disengaging such catch when the door closing operation was to be commenced.

As the movement of the door in the closed direction approaches its conclusion the stud 140 finally engages the block 137 so as to rock the shaft 127 and disengage the hook 126 from the hook 125 of the shoe 124. This permits the rod 117 to snap over towards the right under the influence of its spring 142. At the same time when the door closing movement is completed the notches 41 and 43 will engage the respective latches and the door will be locked in the closed position.

The extraordinary condition indicated in Figure 11 is that in which during the door closing movement the movement of one of the doors is interfered with by an obstruction so that said door becomes unhooked from its hook block, the movement of the master or operating bar and of the other doors continuing to a natural conclusion so as to lock said doors in the closed condition. Under these conditions it becomes possible for the warden to see which door has been obstructed and interfered with because its rod 117 will have been impeded and the corresponding lever 119 will be caught in the coupled position as shown in Figure 5 instead of rising fully to the closed position indicated in Figures 1 and 2. The warden may then proceed to the particular cell, the door of which has been obstructed and remove the obstruction and then he can close said door by hand, whereupon it will snap into the locked position or else he can proceed back to the control stand and cause the closing of this individual door by the use of the master or operating bar and without interfering with the locked condition of any of the other doors, this being possible by reason of the proper manipulation of the other levers 119.

It will sometimes be desirable to control the locking and unlocking of all of the cell doors by a gang device. For this purpose each of the blocks 44 may be provided with a pair of laterally extending fingers 149 and 150 which reach away from the plane in which the doors travel. There is a shaft 151 which extends lengthwise of the tier of cells and carries a disc 152 at the position of each cell. On this disc is a stud 153 which works against the fingers 149 and 150 so as to either raise or lower the block 44 depending upon the position of the shaft 151.

In the arrangement of Figure 22 the block 44 is locked in the lowered position which corresponds also to the condition in which the cell door is locked. Upon turning the shaft 151 one-quarter turn in either direction the stud 153 will be carried to a central or medial position where it does not interfere with the up and down movements of the block 44; whereas by turning the shaft a further distance so as to complete a movement of 180 degrees from Figure 22 the stud 153 will be raised to the top extreme of its movement to thereby raise the locking bar to the fully unlocked position.

The shaft 151 may of course be carried through the length of the structure to a position at the operating box where said shaft may be conveniently manipulated by suitable driving mechanism.

Sometimes it will be desirable to use a gang operating device for all of the levers 119 in the control box. For this purpose I have shown a control shaft 154 extending across the control box and provided with a cam block 155 in position to engage each of the levers 119. These cam blocks 155 are staggered or located at different angular positions on the shaft 154 as shown by the dotted lines in Figure 12 so that the different levers will be moved in sequence one after the other as the shaft 154 is rotated instead of causing all of said levers to simultaneously commence and finish their movements. In other words by staggering the cam blocks on the shaft 154 the different levers will commence their movements in sequence instead of simultaneously and they will also finish their movements in sequence instead of simultaneously. This will result in a considerable reduction in the amount of force necessary to turn the shaft 154 and will also result in other advantages of construction and operation.

In some cases it may be desirable to make provision for locking the cover plates which give access to certain of the control and operating devices. For this purpose I have shown by way of illustration a cover plate 156 over some of the devices contained within that portion of the structure to the left of the partition 45. This cover plate is provided with an inwardly extending hook shaped lug 157, and the disk 152 is provided with an edge flange 158 (see Fig. 25) which engages a notch in the lug 157. Said flange is mutilated at one point as shown in Fig. 22. When the shaft 151 is rotated to a point where this mutilation comes into registration with the notch 158 it is possible to remove the cover plate, but at other times such removal cannot be effected. The mutilation is so located that the cover plate is locked in place at all times except when the shaft 151 is rotated to the unlocking position.

It was mentioned that the control rods 117 are of relatively small size, which result can be attained due to the fact that said rods are at all times under tension of the springs 142. In order to keep these control rods in proper spaced relationship within the head structure through which they extend I provide spacer plates 159 at suitable points within the structure, which spacer plates are provided with the holes 160 to accommodate the rods extending therethrough. The number of these holes decreases as progress is made away from the position of the control house or chamber 118, due to the fact that the rods stop short just beyond the cell doors which they respectively control. And in this connection it may also be mentioned that the tension spring for each rod is preferably located either at or just beyond the position of the cell door whose control rod it maintains under tension.

Examination of the structures in detail will reveal the fact that many evolutions may be performed thereby, and that a wide number of controlling movements may be effected both in the door opening and door closing movements; and that the arrangement is such that each door may be individually controlled from the control station, or at the position of the door itself and that various groups of doors may be gang controlled at the position of the control station, leaving other doors either in their initial conditions or in some intermediate condition. Such individuality of control is made possible due to the presence of the control rods which extend to the locations of the individual cell doors, in conjunction with the master or operating bar arrangement.

While I have herein shown and described only a single embodiment of my invention I do not intend to limit myself thereto except as I may do so in the claims.

I claim:

1. The combination with a series of reciprocatingly mounted cell doors located in alignment with each other, of a reciprocating master bar located in proximity to said cell doors and movable with a reciprocating movement sufficient to ensure complete door opening and closing movements, means under control of the operator for reciprocating said bar, suitable projections on each door, a hook block movably connected to the master bar corresponding to each cell door and adapted to at times engage the projections of the cell door for opening and closing movements, means for ensuring positive engagement of each hook block with its door projection during door opening movements and releasable spring means in conjunction with each hook block permitting movement of such hook block with respect to the master bar to permit disengagement of said hook block from the door projection under excessive strain during door closing movement, substantially as described.

2. The combination with a series of reciprocatingly mounted cell doors, of a reciprocating master bar located adjacent to said cell doors, means under control of the operator for reciprocating said master bar, and means in conjunction with the master bar and movable with respect to the master bar and serving at times to positively open each cell door and also serving at times to close each cell door under yieldable spring tension, whereby the cell doors are positively opened and whereby said spring tension means may yield during door closing movements under conditions of exceptional strain, substantially as described.

3. The combination with a series of reciprocatingly mounted cell doors, of a reciprocating master bar extending along in proximity to all of the cell doors, a hook block movably mounted on the master bar and corresponding to each of the cell doors, means on each cell door for engagement by the corresponding hook block for door opening and closing movements, and means under control of the operator for moving each hook block on the master bar for thereby controlling engagement of each hook block with the corresponding cell door during reciprocating movements of the master bar, substantially as described.

4. The combination with a series of reciprocatingly mounted cell doors, of a reciprocating master bar located adjacent to all of the cell doors, a hook block movably mounted on the master bar and corresponding to each cell door and movable according to the master bar movements, means on each cell door adapted to be engaged by the corresponding hook block when the master bar is reciprocated to move such hook block for door opening and closing movements, means for moving the hook blocks into position for non-engagement with the cell doors at certain times in the reciprocating movements of the master bar, means for retaining the hook blocks in such disengaged condition, and means under control of the operator for thereafter individually controlling the hook blocks to permit them to re-engage with the respective cell doors, substantially as described.

5. The combination with a series of reciprocatingly mounted cell doors, of a reciprocating master bar located in proximity to the cell doors, a series of hook blocks movably mounted on the master bar and corresponding to the cell doors, each cell door being provided with means for engagement by the corresponding hook block at certain times in the reciprocating movements of the corresponding hook block with the master bar, means for periodically moving the hook blocks on the master bar into non-engaging position with the respective cell doors, and means under control of the operator for controlling the re-engagement of the hook blocks on the master bar with the respective cell doors, substantially as described.

6. The combination with a series of reciprocatingly mounted cell doors, of a reciprocating master bar located in proximity to all of the cell doors, of a hook block movably mounted on the master bar for each cell door, means on each cell door adapted to be engaged by the corresponding hook block during reciprocating movements of the master bar and hook block, means for periodically moving the hook blocks on the master bar into non-engaging position with respect to the respective cell doors and means under control of the operator for individually controlling the engagement and disengagement of the hook blocks with the respective cell doors as the master bar is moved, substantially as described.

7. The combination with a series of reciprocatingly mounted cell doors of a series of movably mounted traveling hook blocks corresponding to the cell doors, means on each cell door adapted to be engaged by the corresponding hook block during travel of the hook block for door opening and closing movements, means for individually controlling the engagement and disengagement of the several hook blocks with the respective cell doors for door opening and closing movements as the hook blocks travel, and tension means individual to each of said controlling means for actuating the controlling means into the desired positions, substantially as described.

8. The combination with a series of reciprocatingly mounted cell doors, of a reciprocating and movably mounted hook block for each cell door, means for reciprocatingly moving said hook blocks back and forth for door closing and door opening movements, means on each door for engagement by the corresponding hook block during reciprocating movement of the hook block when in one position and tension means under control of the operator individual to each of said hook blocks for controlling the moved positioning of said hook blocks for door engagements thereby as the hook blocks are reciprocated, substantially as described.

9. The combination with a series of reciprocatingly mounted cell doors, of a reciprocating and movably mounted hook block for each cell door, means on each cell door for engagement by the corresponding hook block for door opening and closing movements when the hook block is in one position on its mounting, means for at times moving the hook blocks on their mountings into cell door disengaging positions, means for locking the hook blocks in said positions and tension means under control of the operator individual to each cell door for controlling said parts, substantially as described.

10. The combination with a series of reciprocatingly mounted cell doors, of a reciprocating and movably mounted hook block for each cell door, means on each cell door for engagement by the corresponding hook block for door opening and closing movements, means for at times moving the hook blocks on their mountings into cell door disengaging position and for retaining the hook blocks in such moved position, tension means for controlling each of said devices, and spring means normally moving each of said tension means into position to permit engagement of the respective cell doors by the several hook blocks when the hook blocks are reciprocated, substantially as described.

11. The combination with a series of reciprocatingly mounted cell doors, of a reciprocating and movably mounted hook block for each of said cell doors, a series of tension members corresponding to the respective cell doors, spring means normally drawing each tension member into an initial or normal position, means under control of the operator for individually moving said tension members into various controlling positions, and means actuated by each tension member for controlling engagement and disengagement of the corresponding hook block with its respective cell door during reciprocation of the hook block, substantially as described.

12. The combination with a series of reciprocatingly mounted cell doors, of a reciprocating and movably mounted hook block for each cell door, means for reciprocating all of said hook blocks in unison, a series of individual tension members corresponding to the respective cell doors, spring means normally moving all of said tension members into a normal position, means under control of the operator for individually moving the tension members into various controlling positions, and means for moving the hook blocks on their mountings to ensure engagement of the respective hook blocks with the several cell doors corresponding to the positions of the individual tension members and when the hook blocks are reciprocated, substantially as described.

13. The combination with a series of reciprocatingly mounted cell doors, of a reciprocating mounting for each cell door, a hook block movably carried by each mounting, means for reciprocating all of the mountings and hook blocks in unison, a series of individual tension members corresponding to the respective cell doors and hook blocks, spring means for normally moving all of said tension members into a normal position, means connected to the tension members and individual to the hook blocks for ensuring engagement and disengagement of the hook blocks with the respective cell doors corresponding to the individual positions of the respective tension members, and visual means connected to the tension members for indicating to the operator the individual conditions of the several cell doors corresponding to the respective positions of the several tension members, substantially as described.

14. The combination with a series of reciprocatingly mounted cell doors, of a series of reciprocating hook block mountings, hook blocks movable on said mountings and corresponding to the several cell doors, means for reciprocating all of said mountings and hook blocks in unison, means for periodically moving the hook blocks on the mountings for causing engagement and disengagement of the hook blocks with the respective cell doors, individual tension devices corresponding to all of the cell doors, spring means normally moving all of said tension devices into a normal position, and means for causing the engagement and disengagement of the several hook blocks with respective cell doors as the mountings are reciprocated and corresponding to the momentary positions of the individual tension members, substantially as described.

15. The combination with a cell door mounted for reciprocation towards and from a fixed structure of a longitudinally extending projection on the lower end thereof projecting beyond the closing edge of the door and having a longitudinal dimension at least as great as the reciprocating movement of the cell door, there being an aperture in a portion of said fixed structure adjacent to the lower edge of the door and for accommodation of said projection, and there being a locking notch on said projection, together with means adjacent to the fixed structure for engaging said notch to lock the cell door in the closed position, whereby the aperture in which said projection moves is never normally uncovered by withdrawal of the projection during the normal extreme door movement, substantially as described.

16. The combination with a cell door mounted for reciprocation towards and from a fixed structure and having a normal range of door opening and closing movements, of a longitudinal projection on the lower portion of said door, there being an aperture in said fixed structure through which aperture said projection normally reciprocates, together with means for at times locking the door in closed position by the use of said projection, whereby during normal door opening and closing movements said aperture is not uncovered by complete withdrawal of the projection during full door closing movement, substantially as described.

17. The combination with a cell door mounted for reciprocation towards and from a fixed structure and adapted for normal door opening and closing movements within a given range, of longitudinal projections on the upper and lower edges of said door, there being notches in said projections, a vertically movable locking bar in the fixed structure and adjacent to the edge portion of the door when in closed position, a tongue on said locking bar for engagement with the notch of the upper projection on the door, and means for engaging the notch of the lower projection on the door when the locking bar is moved into locking position, substantially as described.

18. The combination with a reciprocatingly mounted cell door adapted for back and forth door opening and closing movements, of means for locking the upper portion of the door against opening movement, means for locking the lower portion of the door against opening movement including a dog adapted to engage a part connected to said lower portion of the door, means for disengaging the locking means for the upper portion of the door, and means for disengaging the locking means for the lower portion of the door, said last mentioned disengaging means being independently movable with respect to the first named disengaging means, substantially as described.

19. The combination with a series of reciprocatingly mounted cell doors, of means for shifting said doors for door opening and closing operations, means for individually controlling the actuation of the different doors by said shifting means, a single longitudinally extending rotary control shaft for the entire gang, a removable cover plate normally standing in position to cover over and enclose said devices, a locking element in conjunction with the inner face of said cover plate, and a mutilated flange carried by and rotatable with the shaft and adapted to engage the locking element of the cover plate for locking the cover plate in position at all times except when the mutilated portion of the flange is in registry with the locking device of the cover plate, substantially as described.

FOLGER ADAM.